US012794775B2

(12) United States Patent
Bansal et al.

(10) Patent No.: US 12,794,775 B2
(45) Date of Patent: *Nov. 10, 2026

(54) CELLULAR NETWORK CLOUD APPLICATION CONTROLLED SLICE MANAGEMENT

(71) Applicant: Boost SubscriberCo LLC, Englewood, CO (US)

(72) Inventors: Ashish Bansal, Frisco, TX (US); Siddhartha Chenumolu, Ashburn, VA (US); Paul-André Raymond, Reston, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/824,600

(22) Filed: Sep. 4, 2024

(65) Prior Publication Data

US 2024/0430165 A1 Dec. 26, 2024

Related U.S. Application Data

(63) Continuation of application No. 18/334,722, filed on Jun. 14, 2023, now Pat. No. 12,113,674, which is a continuation of application No. 17/318,208, filed on May 12, 2021, now Pat. No. 11,743,125.

(51) Int. Cl.

| | |
|---|---|
| ***H04L 41/0893*** | (2022.01) |
| ***G06F 9/455*** | (2018.01) |
| ***H04L 41/0806*** | (2022.01) |

(52) U.S. Cl.

CPC ...... *H04L 41/0893* (2013.01); *G06F 9/45558* (2013.01); *H04L 41/0806* (2013.01); *G06F 2009/45595* (2013.01)

(58) Field of Classification Search

CPC ............ H04L 41/0893; H04L 41/0806; G06F 9/45558; G06F 2009/45595

USPC ........................................................ 709/223

See application file for complete search history.

(56) References Cited

U.S. PATENT DOCUMENTS

| | | | | |
|---|---|---|---|---|
| 2018/0097876 | A1* | 4/2018 | Rolia | H04L 41/5051 |
| 2020/0213937 | A1* | 7/2020 | Yang | H04L 41/40 |
| 2021/0087419 | A1* | 3/2021 | Zhu | C09D 11/103 |
| 2022/0086864 | A1* | 3/2022 | Sabella | H04W 28/06 |

FOREIGN PATENT DOCUMENTS

| | | | |
|---|---|---|---|
| WO | 2020185794 | A1 | 9/2020 |

* cited by examiner

*Primary Examiner* — Frantz B Jean

(74) *Attorney, Agent, or Firm* — Kilpatrick Townsend & Stockton LLP

(57) ABSTRACT

Various systems and methods for cellular network slice management are presented. An application may be determined to be authorized to manage a cellular network slice utilized by the application for communication with user equipment. A request can be received from the application to modify the cellular network slice from the application. In response to the request, a parameter of the cellular network slice may be modified. The cellular network can then use the modified slice for communication with user equipment for the cloud-based application.

20 Claims, 5 Drawing Sheets

CELLULAR NETWORK CLOUD APPLICATION CONTROLLED SLICE MANAGEMENT

CROSS REFERENCE TO RELATED APPLICATIONS

This application is a continuation of U.S. Non-Provisional patent application Ser. No. 18/334,722, filed on Jun. 14, 2023, which is a continuation of U.S. Non-Provisional patent application Ser. No. 17/318,208, filed on May 12, 2021, now U.S. Pat. No. 11,743,125, issued Aug. 29, 2023, the disclosures of which are incorporated by reference herein in their entirety for all purposes.

BACKGROUND

Cellular network slicing allows for dedicated virtual cellular networks to use a common physical infrastructure. A particular cellular network slice can be optimized to provide a particular quality of service (QOS) for specific use cases and groups of end user devices, such as particular groups of users or a particular application.

Conventionally, when a particular QoS for a given application for a group of end user devices is needed, a cellular network slice can be created. The cellular network slice's parameters can be configured such that the given application's QoS needs are met. Such an arrangement, however, can require significant direct configuration by a network architect and may not be reactive to dynamic changes in the user's needs, application's needs, or the conditions on the cellular network.

SUMMARY

Various embodiments are described related to a cellular network slice management system. In some embodiments, a cellular network slice management system is described. The system may comprise an edge cloud server system that may execute a cloud-based application. The system may comprise a cellular network, comprising a plurality of base stations and a slice orchestrator server system that may be in communication with the cloud-based application executed by the edge cloud server system. The slice orchestrator may be configured to determine that the cloud-based application may be authorized to manage a cellular network slice utilized by the cloud-based application for communication with a plurality of user equipment (UE). The slice orchestrator may be configured to receive a request from the cloud-based application to modify the cellular network slice from the cloud-based application. The slice orchestrator may be configured to, in response to the request, modify a parameter of the cellular network slice. The cellular network uses the modified slice for communication with the plurality of UE for the cloud-based application.

Embodiments of such a system may include one or more of the following features: the parameter of the cellular network slice may be modified by the slice orchestrator server system in response to the request and without input from a user. The parameter may be downlink throughput per UE for the cloud-based application. The parameter may be uplink throughput per UE for the cloud-based application. The parameter may be delay tolerance for the cloud-based application. The cellular network may be further configured to receive a first request from a user that the cloud-based application be activated. The cellular network may be further configured to receive a second request from the user to delegate slice management to the cloud-based application. The cloud-based application may be configured to determine that a number of UE operating on a particular cell of the cellular network using the cloud-based application exceeds a threshold number of UE. The cloud-based application may be configured to, in response to determining that the number of UE operating on the particular cell of the cellular network exceeds the threshold number of UE, transmit the request to modify the cellular network slice to the slice orchestrator server system. The cloud-based application may be configured to monitor performance of one or more UE of the plurality of UE using the cloud-based application. The cloud-based application may be configured to, in response to monitoring the performance of the one or more UE, transmit the request to modify the cellular network slice to the slice orchestrator server system. The cellular network may be a 5G New Radio (NR) cellular network.

In some embodiments, a method for cellular network cloud application controlled slice management is described. The method may comprise determining that a cloud-based application may be authorized to manage a cellular network slice utilized by the cloud-based application for communication with a plurality of user equipment (UE). The method may comprise receiving a request from the cloud-based application to modify the cellular network slice from the cloud-based application. The method may comprise in response to the request, modifying a parameter of the cellular network slice. The cellular network may use the modified slice for communication with the plurality of UE for the cloud-based application.

Embodiments of such a method may include one or more of the following features: the parameter of the cellular network slice may be modified by a slice orchestrator server system in response to the request and without input from a user. The parameter may be downlink throughput per UE for the cloud-based application. The parameter may be uplink throughput per UE for the cloud-based application. The parameter may be delay tolerance for the cloud-based application. The method may further comprise receiving a first request from a user that the cloud-based application be activated. The method may further comprise receiving a second request from the user to delegate slice management to the cloud-based application. The method may further comprise determining, by the cloud-based application, that a number of UE operating on a particular cell of the cellular network using the cloud-based application exceeds a threshold number of UE. The method may further comprise in response to determining that the number of UE operating on the particular cell of the cellular network exceeds the threshold number of UE, transmitting, by the cloud-based application, the request to modify the cellular network slice to a slice orchestrator server system. The method may further comprise monitoring, by the cloud-based application, performance of one or more UE of the plurality of UE using the cloud-based application. The method may further comprise in response to monitoring the performance of the one or more UE, transmitting, by the cloud-based application, the request to modify the cellular network slice to a slice orchestrator server system. The cellular network may be a 5G New Radio (NR) cellular network.

In some embodiments, a non-transitory processor-readable medium is described. The medium may comprise processor-readable instructions configured to cause one or more processors to determine that a cloud-based application may be authorized to manage a cellular network slice utilized by the cloud-based application for communication with a plurality of user equipment (UE). The medium may comprise processor-readable instructions configured to cause one or more processors to receive a request from the cloud-based application to modify the cellular network slice from the cloud-based application. The medium may comprise processor-readable instructions configured to cause one or more processors to, in response to the request, modify a parameter of the cellular network slice. The cellular network may use the modified slice for communication with the plurality of UE for the cloud-based application.

Embodiments of such a medium may include one or more of the following features: the parameter of the cellular network slice may be modified by a slice orchestrator server system in response to the request and without input from a user.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
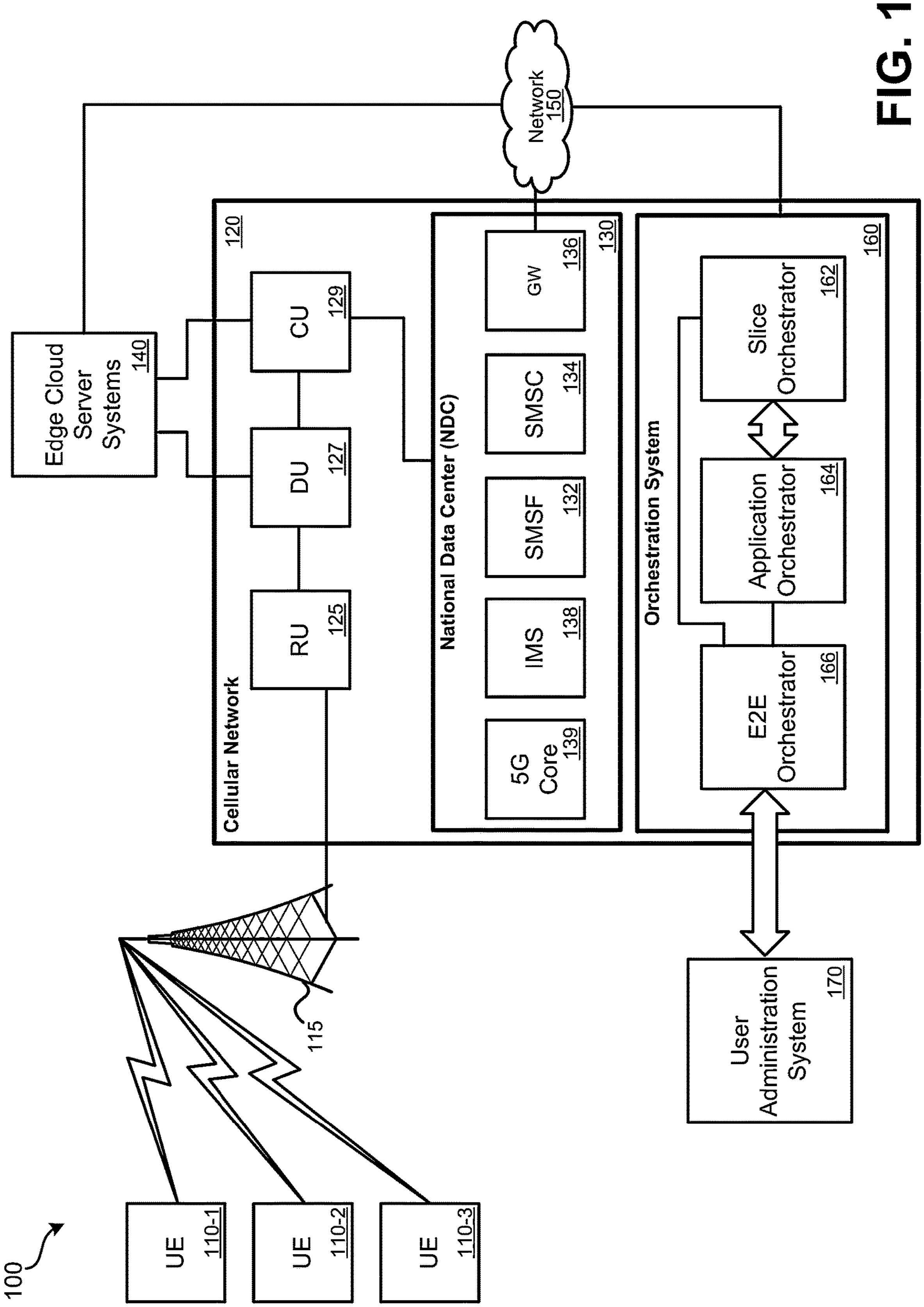
FIG. 1 illustrates an embodiment of an integrated cloud-based application and cellular network slice management system.

When a user, such as an administrator of an entity that manages thousands of pieces of user equipment (UE), is to deploy a cloud-based application for use on the UE, the user may need to deploy the application and configure the cellular network to provide a proper QoS for the application. (As defined herein, UE refers to any wireless device that uses a cellular network for communication. UE can include: mobile devices, gaming devices, cellular phones, smartphones, IoT devices, sensor devices, etc.) These processes are conventionally separate. The user may, through communication with the cellular network, provide a list of parameters that need to be met for the cloud-based application to function properly. Separately, the user may deploy the application at an edge server system that communicates with the UE via the cellular network. In order to adjust performance, the user may reconfigure the application (e.g., the physical location of the server system where the cloud-based application was deployed) or the cellular network (e.g., parameters of the cellular network slice used to provide the application service to the UE).

Increased coordination between deployment of a cloud-based application and cellular network slice configuration can be performed as detailed herein. In some embodiments, a user (e.g., an administrator of an entity's end user devices, a user administration system) may use a portal of a cellular network provider to request access to a cellular network slice for a cloud-based application for one or more UEs. The user or user administration system may have the identity of a UE that is to receive access to an application and, further, may set QoS parameters for the application. A cellular network may coordinate assignment of the UE to a cellular network slice (which may be the same slice or a different slice than other UE of the user) to ensure that the application receives the requested QoS parameters.

In other embodiments, the user, such as via a portal of the cellular network provider, may be permitted to delegate cellular network slice management to the cloud-based application. The user may be permitted to define ranges of parameters and actions that the application is permitted to autonomously request (or is prohibited from requesting). As the location, needs, and numbers of UE using the cloud-based application changes, the cloud-based application may be able to request a new slice and/or changes to an existing cellular network slice to maintain a QoS required for proper functioning of the cloud-based application. Further, an orchestrator of the cellular network may provide feedback to the cloud-based application, such as when one or more of the QoS parameters requested by the cloud-based application cannot be met. In response, the cloud-based application can alter its functionality for the UE with which the QoS parameters cannot be met such that QoS parameters that can be realized are sufficient. Such arrangements can allow for dynamic modification and a more efficient set-up of a network slice to accommodate the needs of a cloud-based application.

Further detail regarding such embodiments and others are provided in relation to the figures. FIG. 1 illustrates an embodiment of an integrated cloud-based application and cellular network slice management system 100 ("system 100"). System 100 can include: UE 110 (UE 110-1, UE 110-2, UE 110-3); base station 115; cellular network 120; radio unit 125 ("RU 125"); distributed unit 127 ("DU 127"); centralized unit 129 ("CU 129"); national data center 130 ("NDC 130"); one or more edge cloud server systems 140; network 150; orchestration system 160; and user administration system 170.

UE 110 can represent various types of end-user devices, such as smartphones, cellular modems, cellular-enabled computerized devices, access points (APs), etc. UE 110 may be able to access various applications, which may be executed in part remotely. For example, a cloud-based application may be executed, at least in part, at edge cloud server system 140. The application may be accessible via a web-based interface or a dedicated application executed by UE 110. Configuration and control of the cloud-based application may be managed by an administrator, such as via user administration system 170.

Depending on the location of individual UEs, UE 110 may use various cells to the base station of cellular network 120 to communicate with edge cloud server systems 140. As illustrated, a single base station 115 ("BS 115") is present. Real-world implementations of system 100 can include many (e.g., thousands) of base stations. BS 115 can include one or more antennas that allow RU 125 to communicate wirelessly with UE 110. RU 125 can represent an edge of cellular network 120 where data is transitioned to wireless communication. The radio access technology (RAT) used by RU 125 may be 5G New Radio (NR), 4G Long Term Evolution (LTE), or some other RAT. The remainder of cellular network 120 may be based on an exclusive 5G architecture, a hybrid 4G/5G architecture, a 4G architecture, or some other cellular network architecture. The cellular network may utilize an Open Radio Access Network (O-RAN) architecture that emphasizes interoperability and standardization of RAN components.

One or more RUs, such as RU 125, may communicate with DU 127. One or more DUs, such as DU 127, may communicate with CU 129. CU 129 can communicate with NDC 130. The specific architecture of cellular network 120 can vary by embodiment. Edge cloud server systems 140 may communicate, either directly, via the Internet, or via some other network, with components of cellular network 120. For example, DU 127 may be able to communicate with edge cloud server system 140 without routing data through CU 129 or NDC 130. Other DUs may or may not have this capability. Similarly, none, some or all, CUs may have the ability to communicate with edge cloud server systems 140 without routing communications through NDC 130. Whether and which cellular components can communicate with edge cloud server systems 140 can vary by embodiment.

Network 150, which edge cloud server systems 140 may use to communicate with DU 127, CU 129, and/or NDC 130, can include one or more public and/or private networks. Network 150 can include the Internet. Network 150 can also include a private network that includes network connections between various components of cellular network 120 and private server systems.

NDC 130 can perform the functions of short message service function (SMSF) 132; short message service center (SMSC) 134; Internet Protocol-Short Message-Gateway (IP-SM-GW); short message service gateway (SMS-GW) 136 (hereinafter "GW 136"); IP Multimedia Subsystem (IMS) 138; and 5G Core 139. SMSF 132 may perform functions including analyzing a subscription or permissions associated with the source and/or the destination of an SMS text. SMSF 132 may only permit the SMS to be completed if in accordance with the subscription or permissions allocated to the transmitting and/or receiving UE. SMSF 132 may serve to forward permitted SMS messages to SMSC 134. GW 136 may facilitate SMS transmissions between cellular network providers and with other forms of networks (e.g., transmission of an SMS message from a computer system that uses the Internet to communicate with GW 136). SMSC 134 may serve to store, forward, convert, and deliver SMS messages for the cellular network. IMS 138 allows for SMS messages to be delivered via IP. IMS 138 routes SMS messages through the user plane and uses IMS to send the SMS to SMSC 134. Regardless of whether an SMS is routed via IMS 138 or via the control plane and SMSF 132, the embodiments presented in this document are applicable.

5G Core 139 can perform a variety of functions. 5G Core 139 can include: authentication server function (AUSF); core access and mobility management function (AMF); data network (DN) which can provide access to various other networks; structured data storage network function (SDSF); and unstructured data storage network function (UDSF). While FIG. 1 illustrates various components of NDC 130 and cellular network 120, it should be understood that other embodiments of cellular network 120 can vary the arrangement and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and NDC 130.

Orchestration system 160 can function as part of cellular network 120 or may be in communication with cellular network 120. Orchestration system 160 can include: edge-to-edge orchestrator 166 ("E2E orchestrator"); application orchestrator 164; and slice orchestrator 162. Each of these components may be implemented using specialized software on general purpose hardware, specialized firmware, or specialized hardware.

A user can interact with the E2E orchestrator via user administration system 170 to specify a cloud-based application and, possibly, a cellular network slice that is to be deployed. A "user" can be an entity that manages some number of UE. For instance, a user may be a company that that has thousands of UE that perform a specific task, such as sensor devices for measuring environmental conditions. As another example, a user may be a gaming company that has a large number of end-user gaming devices (e.g., to play multi-player video games) operated by customers. User administration system 170 may be able to function on behalf of a user without direct input from an administrator. (As an example, if a new UE device associated with the user registers with user administration system 170, user administration system 170 may be able to automatically request slice access via E2E orchestrator 166 on behalf of the new UE.)

A cellular network slice functions as a virtual network operating on an underlying physical network shared with other network slices. Communication and computing bandwidth of the underlying physical network can be reserved for individual network slices, thus allowing the individual network slices to reliably achieve particular QoS parameters. By controlling the location and amount of computing and communication resources allocated to a cellular network slice, the QoS parameters for UE on the cellular network slice can be varied on different slices. A cellular network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

E2E orchestrator 166 may have a customer facing service (CFS) portal. E2E orchestrator 166 can create CFS requests and resource facing service (RFS) requests, such as in accordance with the TMF 641 application programming interface (API). Information from E2E orchestrator 166 may be passed to application orchestrator 164 and slice orchestrator 162.

Application orchestrator 164 and slice orchestrator 162 may communicate directly with each other, through E2E orchestrator 166, or via some other architecture. Application orchestrator 164 may configure the amount of server resources and physical location(s) used to execute a cloud-based application at edge cloud server systems 140. Further, application orchestrator 164 may define particular QoS parameters that need to be met to support the cloud-based application. Details of the location, connection, and functionality of the application may be passed from application orchestrator 164 to slice orchestrator 162.

Further, user administration system 170 can provide information to E2E orchestrator 166 that indicates when a UE is to receive access or to no longer receive access to the cloud-based application. An indication of the geographical location of the UE may also be provided to E2E orchestrator 166 by user administration system 170. Application orchestrator 164 may communicate with slice orchestrator 162 to indicate that a UE is required to receive a particular set of QoS parameters. In response, slice orchestrator 162 may provide a slice identifier of a cellular network slice to which the UE is to be added. This may be a cellular network slice that is particular to the user or some other slice that can meet the requested QoS parameters for the geographic location of the UE.

In some situations, a new slice may need to be created, such as if the UE is to be using the cloud-based application in a geographic region where no existing cellular network slice is sufficient to realize the QoS parameters needed by the cloud-based application. Based on information received from E2E orchestrator 166 and application orchestrator 164, slice orchestrator 162 may create a cellular network slice of which the user plane is used by the cloud-based application for communication with UE. The cloud-based application may only require the cellular network slice in one or more particular geographical regions. Such information may be received from application orchestrator 164 or E2E orchestrator 166. For example, slice orchestrator 162 may receive: an indication of the QoS parameters needed by the cloud-based application, an identifier or the cloud-based application or the user for which the cloud-based application is executed, a geographic region identifier, and/or a number of the UE for which the cloud-based application is to be executed in the geographic region. The cellular network slice may be configured based on characteristics such as: downlink throughput (aggregate for network slice); downlink throughput (per UE); maximum downlink throughput; maximum supported packet size; mission critical level (e.g., compared to other cellular network slices); radio spectrum; packet error rate; supported access technologies; supported device velocity for a defined QoS; uplink throughput (aggregate for network slice); uplink throughput (per UE); maximum uplink throughput; and synchronicity. Slice orchestrator 162 may select, create, and/or modify a cellular network slice to meet the QoS parameters for the cloud-based application. A slice identifier may be sent to E2E orchestrator 166, which may be passed back to user administration system 170 or directly to the UE via cellular network 120. The UE may then use the designated cellular network slice to access the cloud-based application.

On a given cellular network slice, data may be assigned to different layers. A first layer may have a first set of QoS parameters, a second layer may have a second set of different QoS parameters, and so on for potentially a greater number of layers. Therefore, for a given cloud-based application, different types of data may be assigned to different layers depending on the importance of the data. This arrangement allows particular types of data to receive different QoS levels on a same cellular network slice. Further, this arrangement allows mission-critical data for a cloud-based application to be assigned QoS parameters sufficient for proper functionality. Less important data can be provided with less stringent QoS parameters on a different layer.

When a UE is to no longer receive access to the cloud-based application, user administration system 170 may provide an identifier of the UE to E2E orchestrator 166. E2E orchestrator 166 may relay this information to application orchestrator 164 and/or slice orchestrator 162. Slice orchestrator 162 may modify the cellular network slice which the UE previously used to access the cloud-based application to account for the UE no longer having access. For instance, the total uplink and downlink bandwidth may be adjusted for one fewer UE using the cellular network slice. Or, if an insufficient number of UE in the geographic region require access to the cloud-based application, other UE may be reassigned to another cellular network slice that meets sufficient QoS parameters for the cloud-based application and the cellular network slice may be eliminated.

Figure 2:
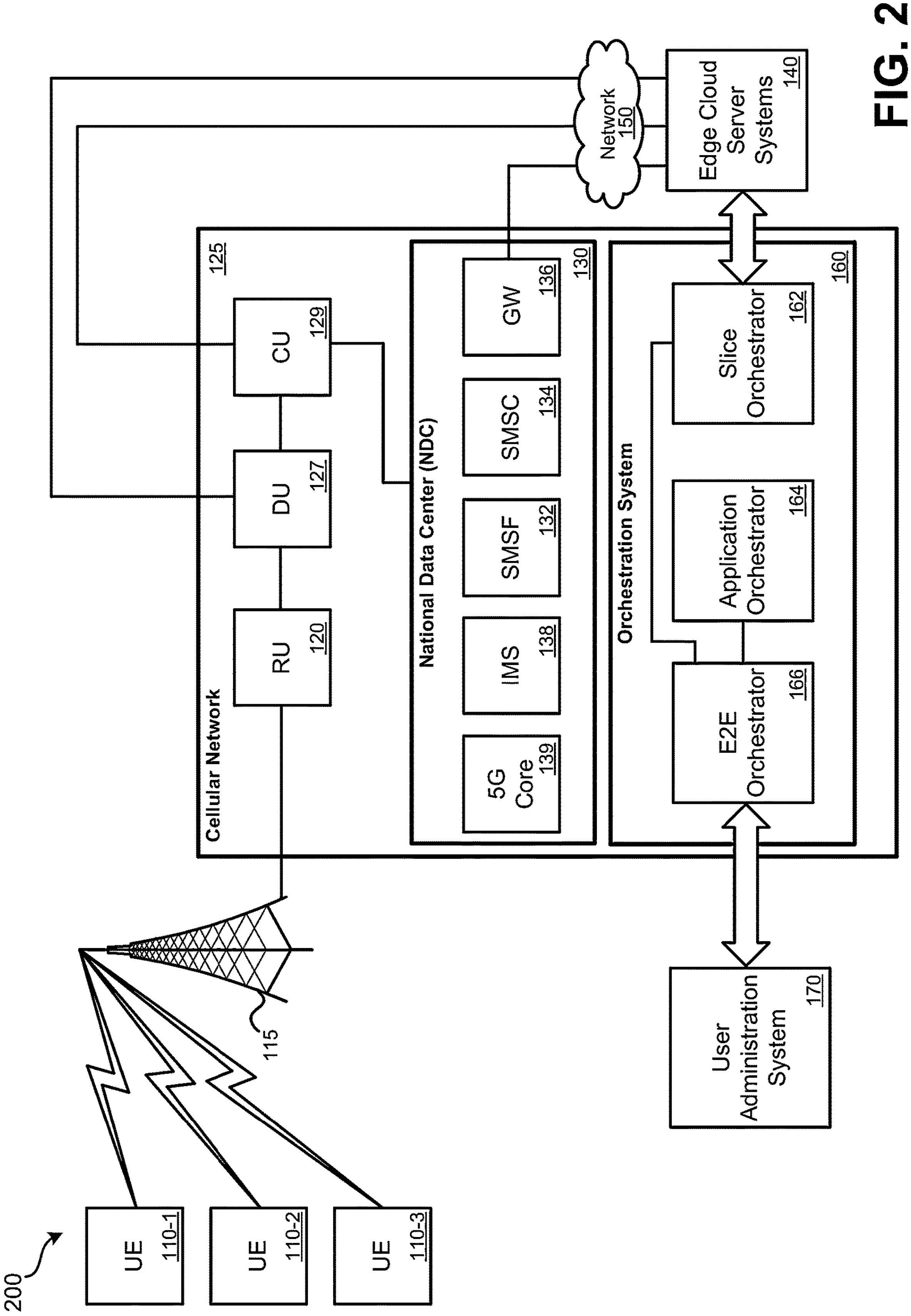
FIG. 2 illustrates an embodiment of a cellular network cloud application-controlled slice management system.

FIG. 2 illustrates an embodiment of a cellular network cloud application controlled slice management system 200 ("system 200"). The components of system 200 may function as detailed in relation to FIG. 1, with a difference in how orchestration system 160 functions and interacts with edge cloud server systems 140.

In system 200, slice orchestrator 162 may receive status information from the cloud-based application being executed on edge cloud server systems 140. The cloud-based application can provide performance data to slice orchestrator 162. The performance data may be indicative of interactions between the cloud-based application and UE, including: latency, jitter, uplink bandwidth, downlink bandwidth etc. In some embodiments, in addition or alternatively to providing such performance data, data sent from the cloud-based application executed by edge cloud server systems 140 to slice orchestrator 162 may be indicative of a request to adjust functionality of the cellular network slice used by the cloud-based application. The request may be for: a new slice for a geographic region; an increase/decrease in downlink bandwidth per UE; an increase/decrease in uplink bandwidth per UE; a total slice bandwidth increase/decrease for a region/cell; a request for a change in how data is routed to/from the cloud-based application, jitter, etc.

In system 200, a user, via user administration system 170 and E2E orchestrator 166, may authorize the cloud-based application with sufficient management rights to make particular types of modifications to one or more cellular network slices, establish cellular network slices, disable cellular network slices and/or adjust QoS parameters of specific layers on a cellular network slice. The user may define upper and lower bounds of particular parameters that the cloud-based application is authorized to adjust without further input or approval from the user. For example, the bandwidth on a cellular network slice for each UE in a given region may be permitted to be raised up to a maximum value (or down to a minimum value) without further input from the user in order to maintain a QoS level for optimal performance by the cloud-based application. As another example, when the number of UE needing to use the cloud-based application in a particular region increases above a threshold number, the cloud-based application may be permitted to establish a cellular network slice (e.g., to ensure a QoS level needed by the cloud-based application remains present).

Feedback can be sent from slice orchestrator 162 to the cloud-based application being executed on edge cloud server systems 140. The feedback may be indicative of whether a requested change to a cellular network slice or a requested QoS parameter by the cloud-based application can be realized. For example, the cloud-based application may request that downlink bandwidth with UE mapped to a user that executes the cloud-based application in a particular geographic region be increased. However, such as due to physical network limitations, slice orchestrator may not be able to meet the request from the cloud-based application. Rather, the slice orchestrator 162 may indicate an alternative amount of downlink bandwidth that can be set on the slice.

The cloud-based application may then adjust its functionality such that the QoS parameters indicated as available by slice orchestrator 162 are sufficient. For example, if the cloud-application involves transmitting video to a UE, the resolution of the video output to the UE by the cloud-based application executed on edge cloud server system 140 may be decreased such that the QoS that can be realized on the cellular network slice is sufficient. Alternatively, data may be reclassified to a different layer on the cellular network slice.

Figure 3:
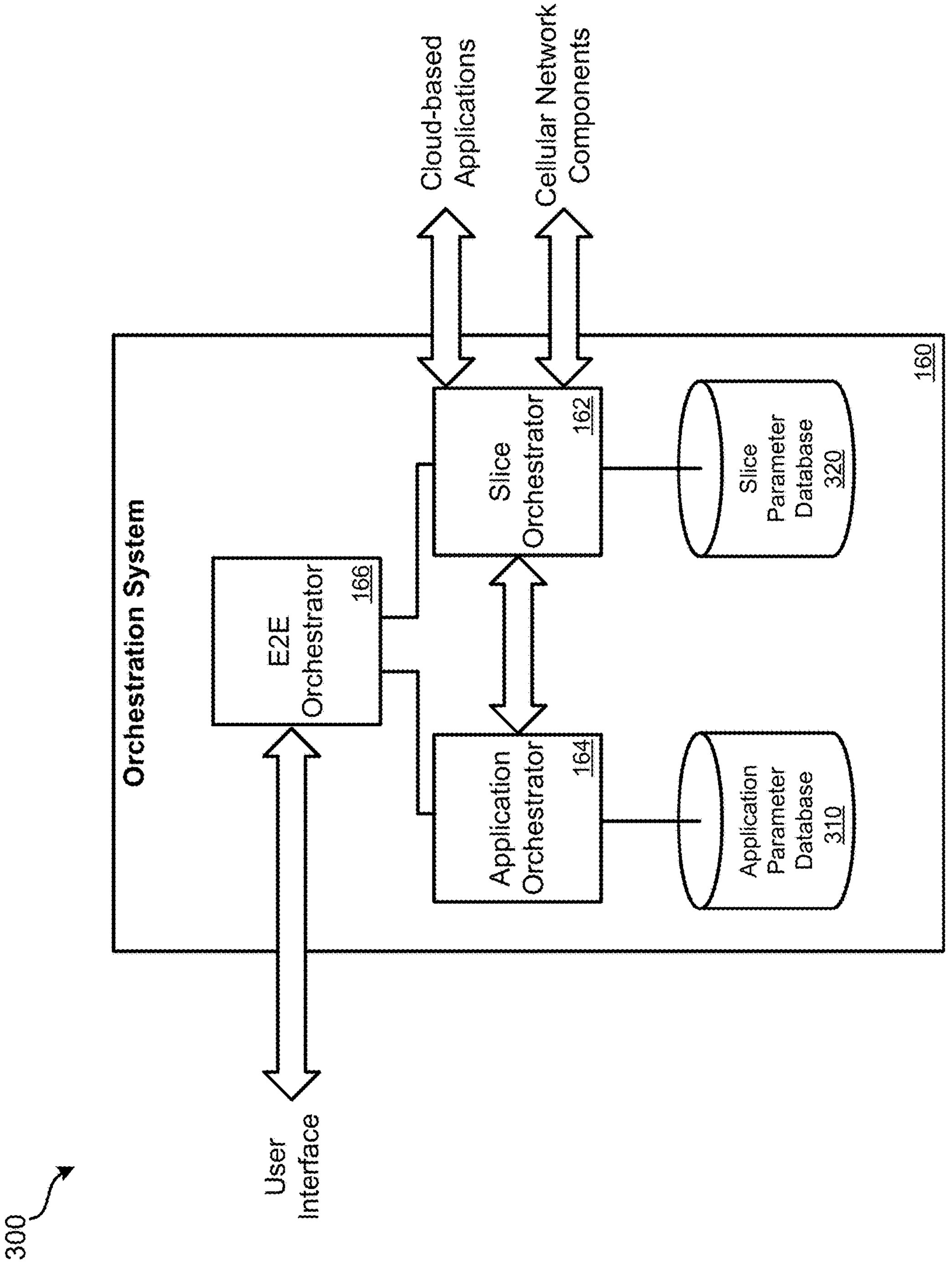
FIG. 3 illustrates an embodiment of a cellular network orchestration system.

FIG. 3 illustrates an embodiment of a cellular network orchestration system 300 ("system 300"). System 300 can represent a more detailed embodiment of orchestrator system 160 of FIGS. 1 and 2. System 300 can include E2E orchestrator 166, application orchestrator 164, slice orchestrator 162, application parameter database 310; and slice parameter database 320. The components of orchestration system 160 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

E2E orchestrator 166 can provide a user interface portal through which a user or user administration system can request a cloud-based application be granted a reserved cellular network slice and, possibly, an associated cellular network slice be created or assigned. Via E2E orchestrator 166, the user can specify: specific UE that are to be permitted to use a cloud-based application; various QoS levels for individual UEs; whether the cloud-based application is authorized to create, disable, or modify cellular network slices; and the parameters and a range for each parameter within which the cloud-based application is permitted to adjust the parameter without further authorization from user. Based upon a physical server location where the cloud-based application is executed such as using application orchestrator 164, parameters of the cellular network slice may be initially set up by slice orchestrator 162. Similarly, based upon parameters of the cellular network slice, the server location(s) at which the cloud-based application is executed and parameters of the cloud-based application may be set.

Application parameter database 310 may be stored using a non-transitory processor readable medium. Application parameter database 310 may be used to store desired application QoS parameters that need to be met for proper functioning of various cloud-based applications. Therefore, when a request is received from a user administration system that indicates a UE is to receive access to a cloud-based application, application parameter database 310 can be used to determine the QoS parameters that need to be met for the UE with the cloud-based application. Slice parameter database 320 may be used to store parameters and acceptable ranges of QoS parameters that are permitted to be varied for the cellular network slice for various cloud-based applications. Therefore, in response to a request from a cloud-based application, slice orchestrator 162 may confirm it has the necessary permissions to adjust a QoS parameter of the cellular network slice (or create or remove a cellular network slice) before implementing such a change.

Figure 4:
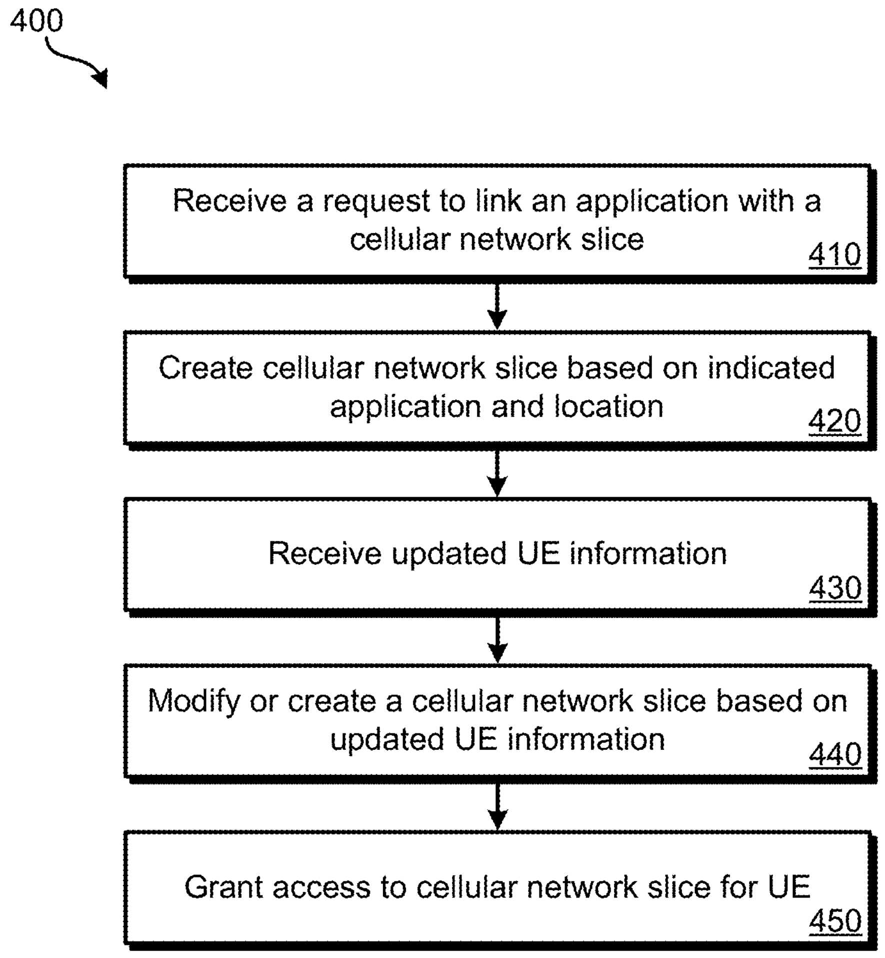
FIG. 4 illustrates an embodiment of a method for integrated cloud-based application and cellular network slice management.

Various methods may be performed using the systems described in relation to FIGS. 1-3. FIG. 4 illustrates an embodiment of a method 400 for integrated cloud-based application and cellular network slice management. Each block of method 400 can be performed using system 100 or system 300. It may also be possible for method 400 to be performed using other forms of cellular network systems.

At block 410, a request can be received for a cellular network slice to be initiated for a cloud-based application and a cellular network slice to be initiated for one or more UEs associated with the user. The user may be an administrator for an organization, such as a company, that may deploy a significant number of UEs or, possibly, a small number of UE that require a particular cloud-based application. The request may be received via a user portal of an orchestration system that functions as part of or in communication with a cellular network, such as a 5G cellular network. The user may request that a cloud-based application be hosted for various UEs of the user, but the specific group of UEs may be fluid (e.g., UEs may be occasionally added or subtracted). The user may specify, as part of the request, details about the execution of the application, such as a logical location in relation to components of the cellular network and/or a physical location. The logical location may be indicative of a communication path between one or more components of the cellular network and the server system(s) hosting the cloud-based application. The physical location may be indicative of where the server system executing the cloud-based application is located. The bandwidth available to communicate between the cellular network and the server system is constrained by the physical communication resources available between the server system and the cellular network.

At block 420, a cellular network slice may be created based on QoE parameters required to be met for proper functioning of the cloud-based application that was requested at block 410. The cellular network slice may define communication and processing resources allocated to the cloud-based application for the group of UE that have access to the application. The cellular network slice may be configured based on the physical location and parameters of the cloud-based application. The UE of the user to be used on the created one or more cellular network slices may be configured to use the cellular network slice(s). These UE may then communicate with the cloud-based application via the cellular network slice.

At block 430, a user or user administration system may provide updated UE information. The Updated UE information may indicate one or more new UE to be added to the cellular network slice, a geographic region for the new UE, one or more UE to be removed from the cellular network slice, and/or a geographic region for the UE being removed. At block 440, in response to the changes to the UE group of the user, the relevant geographic locations, and the QoS parameters that need to be met for the cloud-based application, one or more cellular network slices may be created, modified, or removed. As an example, if 250 UE are added for a geographic region, a QoS parameter of the cellular network slice may need to be adjusted to accommodate a greater total uplink and downlink bandwidth. In some embodiments, an appropriate cellular network slice that can meet the needed QoS parameters may only need to be identified at block 440.

At block 450, access to the cellular network slice may be granted such that the added UE can use the cellular network slice for the cloud-based application. If UE were removed, such UE may no longer be permitted access to the cellular network slice.

Figure 5:
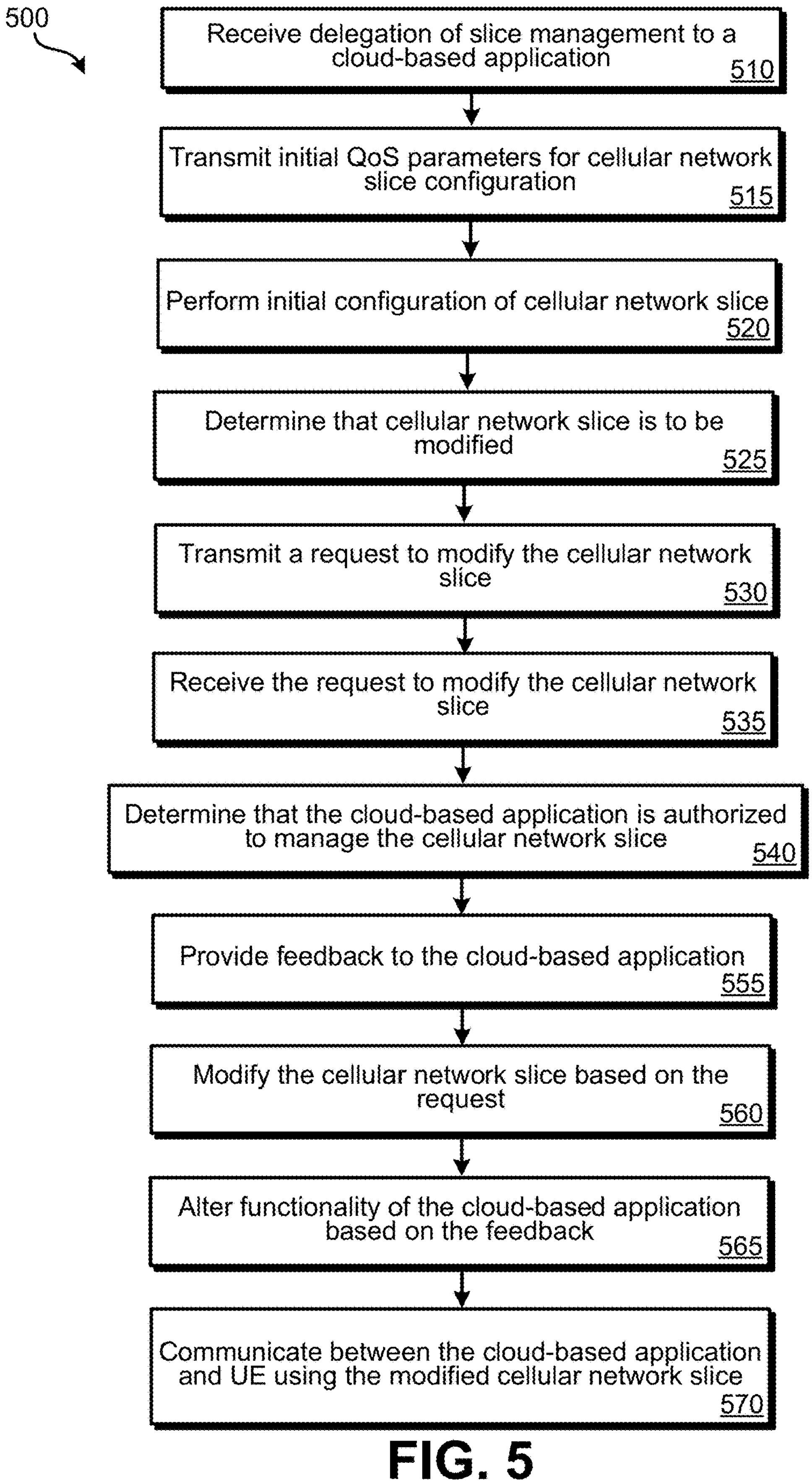
FIG. 5 illustrates an embodiment of a method for cellular network cloud application controlled slice management.

FIG. 5 illustrates an embodiment of a method 500 for a cellular network cloud application controlled slice management. Each block of method 500 can be performed using system 200 or system 300 of FIGS. 2 and 3, respectively. It may also be possible for method 400 to be performed using other forms of cellular network systems.

At block 510, a request can be received for a cloud-based application to be associated with a cellular network slice for one or more UEs associated with the user. The user may be an administrator for an organization, such as a company, that may deploy a significant number of UE or, possibly, a small number of UE that require a particular cloud-based application. As a first example, a company may distribute a gaming device which is to receive gaming services from a cloud-based gaming application via a cellular network slice. The request may be received via a user portal of an orchestration system that functions as part of or in communication with a cellular network, which can be a 5G NR cellular network. The user may delegate setting of QoS parameters of the cellular network slice to the cloud-based application. The user may define acceptable ranges (e.g., minimums and/or maximums) for QoS parameters of the cellular network slice and/or geographic regions in which a cellular network slice is and/or is not permissible to be established. In some embodiments, these acceptable ranges and preferences may be input by the user to the cloud-based application itself. The cloud-based application may then instantiate, remove, and/or modify cellular network slices as needed to maintain QoS levels (e.g., bandwidth from a UE to the cloud-based application server system, bandwidth from the cloud-based application server system to UE, latency, packet loss rate, jitter, etc.) needed by the cloud-based application for proper functioning.

At block 515, the cloud-based application may transmit an initial set of QOS parameters for one or more cellular network slices to the slice orchestrator of the cellular network. In some embodiments, separate QoS parameters may be specified for individual layers on the cellular network slice. The initial set of parameters may additionally indicate one or more geographic regions in which the QoS parameters are to be met. In response, the cellular network may initially configure one or more cellular network slices at block 520 that are dedicated to the cloud-based application for the UE of the user.

At block 525, while the cellular network slice is operating and hosting communication traffic and processing for the cloud-based application with UE associated with the user, a determination may be made by the cloud-based application that the cellular network slice needs to be modified for operating of the cloud-based application with one or more UEs mapped to the user. For instance, while a first latency level may have been previously acceptable for the cloud-based application, changes in functionality of the cloud-based application may require a decrease in latency for communication with UE. The determination of block 520 can be performed by the cloud-based application itself. For example, the cloud-based application may be monitoring latency, data transfer rates, and/or amounts of repeated messages due to lost packets. The determination of block 520 (and subsequent blocks) may not involve any active participation of the user beyond the initial delegation of block 510.

At block 530, a request to modify, establish, or remove a cellular network slice may be transmitted by the cloud-based application to an orchestration system of the cellular network. The request may specify the QoS parameter that needs to be met by the cellular network slice and/or a change to geographical coverage. Various parameters or characteristics of the cellular network slice may be modified, such as: downlink throughput (aggregate for network slice); downlink throughput (per UE); maximum downlink throughput; maximum supported packet size; mission critical level (e.g., compared to other cellular network slices); radio spectrum; packet error rate; supported access technologies; supported device velocity for a defined QOS; uplink throughput (aggregate for network slice); uplink throughput (per UE); maximum uplink throughput; QoS parameters; and synchronicity. In some embodiments, a cellular network slice may be established when a volume of traffic associated with the user for the cloud-based application exceeds a threshold. The request may be received by the cellular network, such as an orchestrator API of the cellular network, at block 535.

At block 540, a determination may be made as to whether the cloud-based application is permitted to make the requested modification, creation, or removal of the cellular network slice based on permissions granted by the user at block 510. If the request is outside the bounds permitted, the orchestrator of the cellular network may either reject the request or may adjust as much as permitted in accordance with a permissible range set by a user at block 510. Feedback may be provided by the cellular network to the cloud-based application at block 555. The feedback may be indicative that the requested change has been made or not made. If the cellular network is not able to meet a particular QoS parameter request for the cellular network slice, such as due to the limitations of the underlying physical network, either a rejection or an indication of the best QoS parameter that can be provided may be sent. Based on this feedback, the functioning of the cloud-based application may be adjusted at block 565.

At block 560, characteristics or QoS parameters of the cellular network slice may be modified in accordance with the request if the cloud-based application is properly authorized to make such a modification.

At block 565, functionality of the cloud-based application may be adjusted in response to the feedback received at block 555. The amount of data exchanged with UE of the user via the cellular network slice may be adjusted such that the QoS parameters that can be provided by the cellular network slice are sufficient. For example, the resolution of video streamed to UE in a particular geographic region may be decreased based on the QoS parameters that can be met in a particular geographic region. As another example, for a UAV control application, a greater safety distance may be enforced by the cloud-based application to account for an amount of latency in communication.

At block 570, communication between UE associated with the user and the cloud-based application may use the modified or new cellular network slice.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for slice management, comprising:
- creating, by a cellular network, a cellular network slice to be accessed by a defined group of user equipment (UE);
- delegating, by the cellular network, setting of quality of service (QOS) parameters for the cellular network slice to a cloud-based application;
- after delegating the setting of the QoS parameters, receiving, by the cellular network from the cloud-based application, a request to update a QoS parameter for the cellular network slice, wherein the request comprises a change to QoS parameter for the cellular network slice; and
- modifying, by the cellular network, the cellular network slice based on the request from the cloud-based application.

2. The method for slice management of claim 1, further comprising:
- determining that the cloud-based application is authorized to manage the cellular network slice, wherein
  - modifying the cellular network slice is further based on determining that the cloud-based application is authorized to manage the cellular network slice.

3. The method for slice management of claim 1, wherein the cloud-based application is executed at a server system residing outside of the cellular network.

4. The method for slice management of claim 1, wherein the cloud-based application is deployed by a first entity separate and distinct from a second entity managing the cellular network.

5. The method for slice management of claim 1, further comprising:
- communicating, by the cellular network, via the modified cellular network slice, with the plurality of UE.

6. The method of claim 1, wherein the QoS parameter is selected from the group consisting of:
- uplink throughput;
- downlink throughput;
- a maximum supported packet size;
- a mission critical level;
- radio spectrum;
- a packet error rate;
- delay tolerance;
- a supported access technology;
- a supported device velocity for a defined quality of service (QOS); and
- synchronicity.

7. The method for slice management of claim 1, further comprising:
- providing, by the cellular network, to the cloud-based application, feedback indicating that the change to the QoS parameter has been made.

8. The method for slice management of claim 7, further comprising:
- in response to the feedback, altering, by the cloud-based application, functionality of the cloud-based application.

9. The method for slice management of claim 1, further comprising:
- performing, by the cellular network, an initial configuration of the cellular network slice based on information provided by the cloud-based application.

10. A cellular network slice management system comprising:
- a cellular network, comprising a plurality of base stations and a slice orchestrator server system that is in communication with an external application;
  - the slice orchestrator server system is configured to:
    - create a cellular network slice to be accessed by a defined group of user equipment (UE);
    - delegate setting of quality of service (QOS) parameters for the cellular network slice to the external application;
    - after delegating the setting of the QoS parameters, receive, from the external application, a request to update a QoS parameter for the cellular network slice, wherein the request comprises a change to QoS parameter for the cellular network slice; and
    - modify the cellular network slice based on the request from the external application.

11. The cellular network slice management system of claim 10, wherein the slice orchestrator server system is further configured to:
- determine that the external application is authorized to manage the cellular network slice, wherein
  - modifying the cellular network slice is further based on determining that the external application is authorized to manage the cellular network slice.

12. The cellular network slice management system of claim 10, wherein the external application is executed at a server system residing outside of the cellular network.

13. The cellular network slice management system of claim 10, wherein the external application is deployed by a first entity separate and distinct from a second entity managing the cellular network.

14. The cellular network slice management system of claim 10, wherein the cellular network is further configured to:

communicate, via the modified cellular network slice, with the plurality of UE.

15. The cellular network slice management system of claim 10, wherein the QoS parameter is selected from the group consisting of:

uplink throughput;
downlink throughput;
a maximum supported packet size;
a mission critical level;
radio spectrum;
a packet error rate;
delay tolerance;
a supported access technology;
a supported device velocity for a defined quality of service (QOS); and
synchronicity.

16. The cellular network slice management system of claim 10, wherein the slice orchestrator server system is further configured to:

provide, to the external application, feedback indicating that the change to the QoS parameter has been made.

17. The cellular network slice management system of claim 16, further comprising the external application, wherein the external application is configured to, in response to the feedback, alter functionality of the external application.

18. The cellular network slice management system of claim 10, wherein the cellular network is further configured to:

perform an initial configuration of the cellular network slice based on information provided by the external application.

19. A non-transitory processor-readable medium, comprising processor-readable instructions configured to cause one or more processors to:

create a cellular network slice to be accessed by a defined group of user equipment (UE);

delegate setting of quality of service (QOS) parameters for the cellular network slice to a cloud-based application;

after delegating the setting of the QoS parameters, receive, from the cloud-based application, a request to update a QoS parameter for the cellular network slice, wherein the request comprises a change to QoS parameter for the cellular network slice; and modify the cellular network slice based on the request from the cloud-based application.

20. The non-transitory processor-readable medium of claim 19, wherein the processor-readable instructions further comprise processor-readable instructions that cause the one or more processors to:

determine that the cloud-based application is authorized to manage the cellular network slice, wherein the cellular network slice is modified based on determining that the cloud-based application is authorized to manage the cellular network slice.

* * * * *